United States Patent [19]
Tobias

[11] Patent Number: 6,097,988
[45] Date of Patent: Aug. 1, 2000

[54] LOGIC SYSTEM AND METHOD EMPLOYING MULTIPLE CONFIGURABLE LOGIC BLOCKS AND CAPABLE OF IMPLEMENTING A STATE MACHINE USING A MINIMUM AMOUNT OF CONFIGURABLE LOGIC

[75] Inventor: David F. Tobias, Pflugerville, Tex.

[73] Assignee: Advanced Micro Devices, Inc., Sunnyvale, Calif.

[21] Appl. No.: 09/021,350

[22] Filed: Feb. 10, 1998

[51] Int. Cl.[7] .............................. G05B 11/01; G06F 7/38
[52] U.S. Cl. ................................ 700/23; 700/7; 700/11; 700/12; 326/38; 326/39; 326/40; 326/46
[58] Field of Search .................... 326/40, 38, 39, 326/46; 700/11, 12, 27, 10, 2, 7, 20, 23, 86, 87

[56] References Cited

U.S. PATENT DOCUMENTS

| | | | |
|---|---|---|---|
| 5,109,353 | 4/1992 | Sample et al. | 395/500.18 |
| 5,787,007 | 7/1998 | Bauer | 395/500.17 |
| 5,802,290 | 9/1998 | Casselman | 709/201 |
| 5,892,961 | 4/1999 | Trimberger | 712/10 |
| 5,995,744 | 11/1999 | Guccione | 395/500.44 |

*Primary Examiner*—Paul P. Gordon
*Attorney, Agent, or Firm*—Kevin L. Daffer; Conley, Rose & Tayon

[57] ABSTRACT

A logic system is presented including multiple configurable logic blocks (CLBs) implementing a state machine having multiple states, each state being associated with one or more logic functions and one or more possible next states. Each CLB includes programmable logic circuitry, and is configurable to implement the logic functions required in any given state. A complex state machine may be implemented using only 1+s CLBs, where s is the maximum number of next states of any state, thereby using a minimum amount of configurable logic. The logic system also includes a memory unit, a control unit coupled to the memory unit and to each of the CLBs, and an interface unit coupled to the control unit and to each of the CLBs. The memory unit stores configuration data required to configure the CLBs and state transition information. The control unit generates and stores current state information. Following programming, a single "active" CLB implements the logic functions required in the current state. The remaining CLBs are "inactive". While in the current state, the control unit uses state transition information from the memory unit and current state information to determine the possible next states. The control unit then retrieves configuration data from the memory unit corresponding to each of the possible next states, and programs one inactive CLB for each possible next state. The interface unit routes input signals to, and output signals from, the active CLB in response to a control signal from the control unit.

21 Claims, 5 Drawing Sheets

LOGIC SYSTEM AND METHOD EMPLOYING MULTIPLE CONFIGURABLE LOGIC BLOCKS AND CAPABLE OF IMPLEMENTING A STATE MACHINE USING A MINIMUM AMOUNT OF CONFIGURABLE LOGIC

BACKGROUND OF THE INVENTION

1. Field of the Invention

This invention relates to the manufacture of digital logic systems, and more particularly to the fabrication of integrated circuits.

2. Description of the Relevant Art

Electronic logic circuits (i.e., switching networks) are used in almost every modem device, from automobiles to televisions to washing machines. Logic circuits receive one or more input values and produce one or more output values. There are two basic types of logic circuits: combinational logic circuits and sequential logic circuits. The output values of a combinational logic circuit depend only upon the current input values. The output values of a sequential logic circuit, on the other hand, depend upon both the current input values and the previous input values. Sequential logic circuits (i.e., sequential networks) necessarily include storage elements which enable them to "remember" information about past input values.

A sequential network is composed of a combinational network and one or more storage elements. Storage elements called "flip-flops" sample their input values and change their output values at times determined by a "clocking" signal, and are commonly used in sequential networks. Sequential networks are used to implement "state machines" which accomplish processes having multiple steps. A sequential network implementing a state machine uses one or more "state" values to represent all of the information about past input values required to determine the state machine's future behavior. The storage elements of the sequential network store the state values. The set of all combinations of state values uniquely identify the two or more "states" of the state machine. More and more devices are electronically controlled, and the control units of these devices typically include sequential networks implementing state machines in order to accomplish complex tasks.

Programmable logic devices (PLDs) are commonly used to implement logic networks. PLDs are general-purpose digital components which are manufactured in an "unprogrammed" state, and are later "programmed" to implement a desired logical function. A PLD is typically programmed by a sequence of electrical pulses which configure one or more arrays of programmable switching elements within the PLD. Examples of different types of PLDs include programmable read-only memories (PROMs), field programmable logic arrays (FPLAs), programmable array logic devices (PALs), and field programmable gate arrays (FPGAs). A PROM with m inputs (i.e., address inputs) and n outputs (i.e., data outputs) can be configured to perform any m-input, n-output combinational logic function. FPLAs and PALs have AND and OR arrays. The AND array performs logical AND operations upon input values and their complements, forming product terms. The OR array performs logical OR operations upon the product terms, forming output values. The AND and OR arrays of FPLAs include programmable switching elements, while only the AND arrays of PALs are programmable. FPLAs and PALs implement combinational logic functions as a sum of the product terms (i.e., a sum of products) of input values.

FPGAs are semi-custom logic devices including "islands" of programmable logic blocks called "logic cells" surrounded by an interconnection network which includes programmable switching elements. The logical functions performed by the logic cells are determined by programming, as are the interconnections formed between the logic cells. FPLAs, PALs, and FPGAs may also include storage elements (e.g., flip-flops) needed to implement sequential logic circuits.

A PROM with m address inputs and n data outputs includes $2^m \cdot n$ programmable switching elements, one for every storage element within the PROM. For example, a 256×8 PROM has 8 inputs, 8 outputs, and 2,048 programmable switching elements. The 256×8 PROM can be programmed to perform, for example, a multiplication function wherein two 4-bit unsigned binary input values produce an 8-bit product term. As the number of programmable switching elements doubles with each added input, PROMs have difficulty accommodating functions with large numbers of inputs.

An FPLA is a combinational, two-level AND-OR device that can be programmed to realize any sum-of-products logic expression subject to the size limitations of the device. FPLA limitations are the number of inputs, the number of outputs, and the number of product terms. An FPLA with m inputs, n outputs, and p product terms can only perform logic functions having p or fewer product terms. The FPLA includes $(2m+n) \cdot p$ programmable switching elements, compared to the $2^m \cdot n$ programmable switching elements within the corresponding PROM. When the number of input variables is small, PROM realizations are more economical than FPLA realizations. FPLA realizations become cost effective when the number of input variables is large. For example, an FPLA with 16 inputs, 8 outputs, and 48 product terms includes 1,920 programmable switching elements. A corresponding 65,536×8 PROM would include 524,288 programmable switching elements.

A PAL is also a combinational, two-level AND-OR device subject to the same size limitations as a corresponding FPLA device. As described above, the AND and OR arrays of PLAs include programmable switching elements, while only the AND arrays of PALs are programmable. A PAL with m inputs, n outputs, and p product terms includes $2^m \cdot p$ programmable switching elements, compared to the $2^m \cdot n$ programmable switching elements within a corresponding PROM and the $(2m+n) \cdot p$ programmable switching elements within the corresponding FPLA. For example, a PAL with 16 inputs, 8 outputs, and 48 product terms includes 1,536 programmable switching elements. The corresponding FPLA includes 1,920 programmable switching elements, and the corresponding 65,539×8 PROM would include 524,288 programmable switching elements as described above. PALs achieve economy over PLAs and ROMs by using fewer programmable switching elements to realize logic functions.

A PLD is ultimately configured according to configuration data within a configuration file. The configuration data within the configuration file essentially forms a "logic image" of the function to be performed by the PLD. Few logic designers generate configuration files directly. Most logic designers use PLD design software to specify logic equations symbolically and to generate device configuration files. Modem PLD design programs allow designers to input desired logic functions as Boolean equations, state machine equations, or as expressions of a hardware description language. Some PLD design programs employ schematic capture to determine a desired logic function. Acting much like a computer language compiler, the PLD design program generates PLD configuration files from logic function inputs.

A logic designer considers several factors when selecting a discrete PLD device, among them the required number of input pins, output pins, input/output (I/O) pins, flip-flops, and product terms. The PLD design program aids in simplifying logic equations and selecting a PLD with a sufficient number of input pins, output pins, input/output (I/O) pins, flip-flops, and product terms. In general, the greater the number of logic equations (i.e., outputs), and the greater the number of input variables and state variables required to realize the logic equations, the larger the PLD required to realize the desired logic function.

It is expected that a given device may be required to perform several different logic functions at different times. A straightforward solution to this problem is to design a PLD capable of performing all of the required logic functions, and to issue control signals to direct the performance of each logic function. A drawback of this approach is that the size of the resulting PLD is relatively large in order to realize all of the required logic functions. The cost of a PLD is typically proportional to the number of programmable switching elements within the PLD, thus the relatively large PLD is also costly. In addition, as the logic functions are performed at different times, a large portion of the PLD is inactive at any given time. It would thus be desirable to have a way to dynamically program a relatively small amount of programmable logic to perform logic functions as required.

SUMMARY OF THE INVENTION

The problems outlined above are in large part solved by a logic system including multiple configurable logic blocks (CLBs) and capable of implementing a state machine using a minimum amount of configurable logic. The state machine has multiple states, and each state is associated with one or more logic functions and one or more possible next states. Each CLB includes programmable logic circuitry, and may be configured to implement the one or more logic functions required in any given state. A complex state machine may be implemented using only 1+s CLBs, where s is the maximum number of next states of any state in the state machine. Each CLB is preferably sized only large enough to realize the logic functions required in any given state.

The logic system also includes a memory unit, a control unit coupled to the memory unit and to each of the CLBs, and an interface unit coupled to the control unit and to each of the CLBs. The memory unit stores configuration data required to configure the CLBs. The stored configuration data is accessible by state. The configuration data corresponding to a given state is sufficient to configure one of the CLBs to perform the one or more logic functions associated with the state. The memory unit also stores state transition (i.e., state table) information associated with the state machine.

The control unit includes logic circuitry and multiple storage elements (e.g., flip flops) which generate and store information identifying the current state. Following programming, a single "active" CLB implements the one or more logic functions required in the current state. The remaining CLBs are "inactive". While in the current state, the control unit retrieves state transition information from the memory unit, and uses the state transition information and the current state information to determine the one or more possible next states. The control unit then retrieves configuration data from the memory unit corresponding to each of the possible next states, and uses the configuration data to produce configuration signals which configure (i.e., program) one or more of the inactive CLBs to realize the logic functions required in each of the possible next states. One inactive CLB is programmed for each possible next state. The interface unit routes input signals to, and output signals from, the active CLB in response to a control signal from the control unit.

Each CLB includes programmable logic, preferably PAL logic. The CLBs may also include other types of programmable logic such as, for example, EEPROM, FPLA, or FPGA logic. Each CLB also preferably includes storage elements (e.g., flip-flops) needed to implement sequential logic functions. The CLBs are treated as resources to be allocated to states as they are entered. A sufficient number of inactive CLBs are configured in advance to meet the needs of all possible next states.

The memory unit preferably includes mask-programmable read-only memory (ROM) storage elements. The contents of such mask ROM storage elements are determined during the manufacture of the memory unit. The memory unit may also include other types of storage elements such as, for example, EPROM elements, EEPROM elements, non-volatile random access memory (NV-RAM) elements, static random access memory (SRAM) elements, or dynamic random access memory (DRAM) elements.

The logic system also includes a control bus which couples the control unit to each of the CLBs. The control unit uses the control bus to convey configuration signals and an enable signal to the CLBs. The logic system also includes multiple interface buses, each interface bus coupling the interface unit to a CLB. The interface unit uses the appropriate interface bus to route input signals to, and output signals from, the active CLB.

The logic system of the present invention may be implemented by interconnecting several discrete semiconductor logic devices. A preferred embodiment of the present invention is a single semiconductor logic device including the multiple CLBs, the memory unit, the control unit, and the interface unit formed upon a single monolithic silicon substrate. The logic device also includes the control bus, the multiple interface buses, an input/output (I/O) pad for a 'Clock' signal, and a set of I/O pads for receiving input signals and for providing output signals.

The CLBs preferably include constructs used to perform Joint Test Action Group (JTAG) boundary-scan testing. The boundary-scan constructs are preferably used to test the CLBs during testing operations, and to configure the CLBs to perform the one or more logic functions associated with a state of the state machine during programming operations.

BRIEF DESCRIPTION OF THE DRAWINGS

Other objects and advantages of the invention will become apparent upon reading the following detailed description and upon reference to the accompanying drawings in which.

Figure 1:
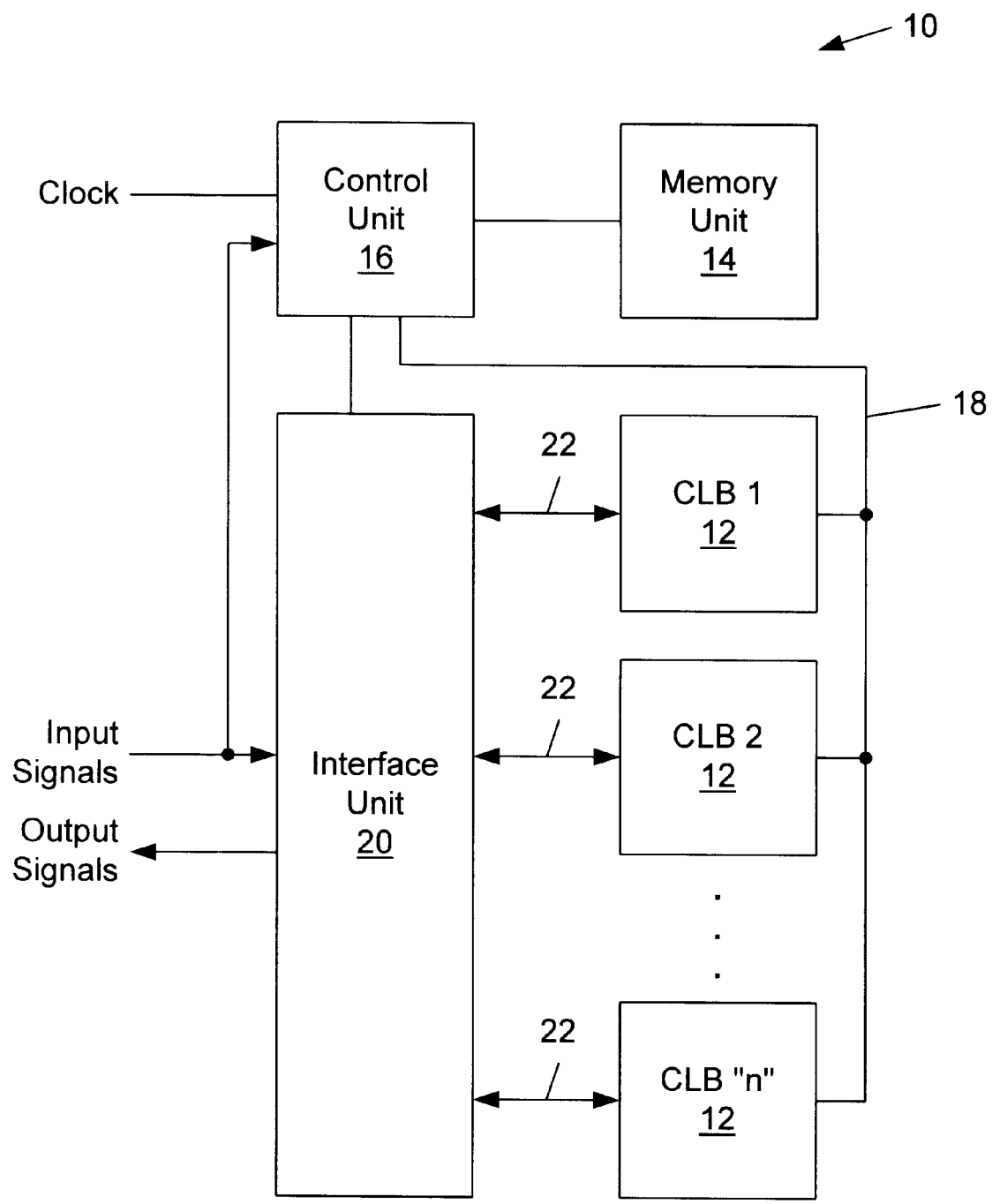
FIG. 1 is a block diagram of a logic system used to implement a state machine having multiple states, wherein each state has associated with it one or more logic functions and one or more possible next states.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of a logic system 10 used to implement a state machine having multiple states, each state having associated with it one or more logic functions and one or more possible next states. Logic system 10 includes n configurable logic blocks (CLBs) 12, where n≧2. Each CLB 12 includes programmable logic, and is configurable to implement the one or more logic functions associated with any given state. Logic system 10 also includes a memory unit 14 which stores configuration data required to configure the CLBs 12. Configuration data stored within memory unit 14 is accessible by state. The configuration data corresponding to a given state is sufficient to configure one of the CLBs 12 to perform the one or more logic functions associated with the state. Memory unit 14 also stores state transition (i.e., state table) information of the state machine. Logic system 10 also includes a control unit 16 coupled to memory unit 14 and to each of the multiple CLBs. Control unit 16 includes logic circuitry and multiple storage elements (e.g., flip flops) which generate and store information identifying the current state.

During operation of logic system 10, a single active CLB 12 implements the one or more logic functions required in the current state. The remaining CLBs 12 are inactive. Control unit 16 retrieves state transition information from memory unit 14, and uses the state transition information and the current state information to determine the possible next states. Control unit 16 then retrieves configuration data from memory unit 14 corresponding to each of the possible next states, and uses the configuration data to produce configuration signals which configure (i.e., program) one or more of the inactive CLBs 12 to realize the logic functions required in each of the possible next states. One inactive CLB 12 is programmed for each possible next state. Logic system 10 also includes an interface unit 20 coupled to control unit 16 and to each of the multiple CLBs 12. Interface 20 routes input signals to, and output signals from, the active CLB 12 in response to a control signal from control unit 16.

Logic system 10 preferably includes only 1+s CLBs, where s is the maximum number of next states of any state in the state machine to be implemented. In addition, each CLB is preferably sized only large enough to realize the logic functions required in any given state of the state machine. As a result, Logic system 10 advantageously implements the state machine using a minimum amount of configurable logic.

Control unit 16 receives a 'Clock' signal and a subset of input signals. The 'Clock' signal is used to synchronize the operations within logic system 10. The multiple storage elements within control unit 16 store the current state information. The logic circuitry within control unit 16 uses the subset of the input signals and the current state information to generate next state information. The next state information is provided as inputs to the multiple storage elements. The outputs of the multiple storage elements change to the next state information during the next 'Clock' signal cycle.

Each CLB 12 is coupled to control unit 16 via a control bus 18. Control bus 18 includes multiple signal lines, one of which is used to distribute the 'Clock' signal to each CLB 12. During testing and programming operations, control unit 16 conveys test and configuration signals, respectively, to one or more CLBs 12 via control bus 18. Control unit 16 also conveys an enable signal to each CLB 12 via one or more signal lines of control bus 18. The enable signal enables the operation of the active CLB 12 and disables the operations of the remaining inactive CLBs 12.

Interface unit 20 is coupled to each CLB 12 by a corresponding interface bus 22. In response to a control signal from control unit 16, interface unit 20 routes input signals to, and output signals from, the active CLB 12 via the corresponding interface bus 22.

During a first 'initialization' state, control unit 16 programs one of the CLBs 12 to perform one or more logic functions required during a second state entered following the 'initialization' state. When the selected CLB 12 has been programmed, the second state is entered during the next 'Clock' signal cycle. Control unit 16 asserts the enable signal corresponding to the programmed CLB 12, activating the programmed CLB 12. Control unit 16 also issues a control signal to interface unit 20 which causes interface unit 20 to route input signals to, and output signals from, the active CLB 12. The active CLB 12 performs the one or more logic functions required during the second state. While the active CLB 12 is performing the one or more logic functions, control unit 16 retrieves the state transition information stored within memory unit 14. Control unit 16 uses the current state information and the state transition information to determine the possible next states. Control unit 16 then retrieves configuration data from memory unit 14 corresponding to the possible next states, and uses the configuration data to produce configuration signals which configure (i.e., program) one or more of the inactive CLBs is 12 to realize the logic functions required in each of the possible next states.

The configuration data is preferably compressed before being stored within memory unit 14 in order to reduce the number of storage locations required to store the configuration data. In this case, control unit 16 retrieves the compressed configuration data from memory unit 14 and decompresses the compressed configuration data before using the configuration data to generate the configuration signals.

Each CLB 12 includes programmable logic, preferably PAL logic. CLBs 12 may also include other types of programmable logic such as, for example, EEPROM, FPLA, or FPGA logic. Each CLB also preferably includes storage elements (e.g., flip-flops) needed to implement sequential logic functions.

Memory unit 14 preferably includes mask-programmable read-only memory (ROM) storage elements. The contents of such mask ROM storage elements are determined during the manufacture of memory unit 14. Memory unit 14 may also include other types of storage elements such as, for example, well known EPROM elements, EEPROM elements, NV-RAM elements, SRAM elements, or DRAM elements.

Figure 2:
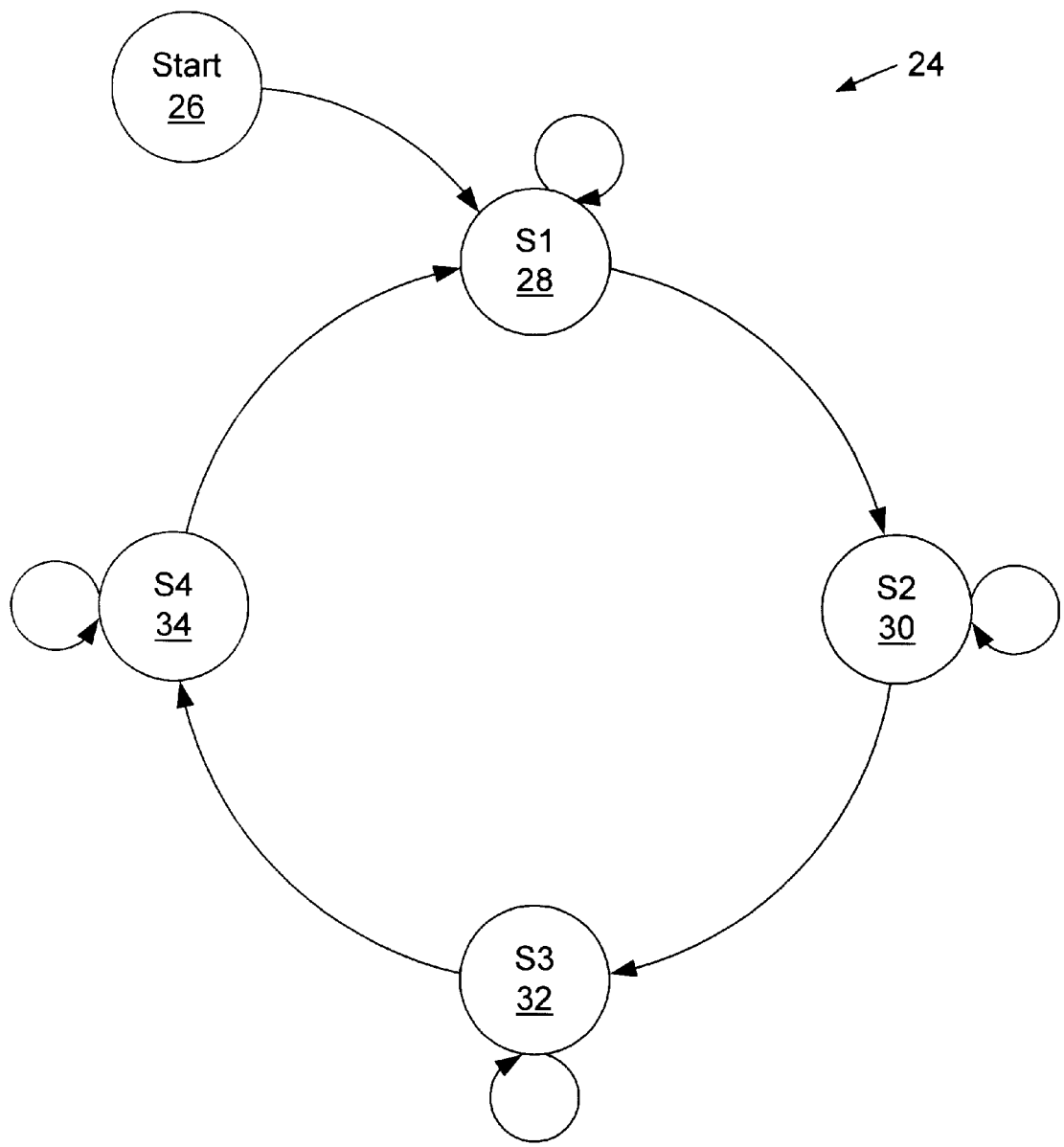
FIG. 2 is a state diagram describing a state machine to be implemented using the logic system of FIG. 1.

The following working example will be used to further describe the operation of logic system 10 of FIG. 1. FIG. 2 is a state diagram describing a state machine 24 to be implemented using logic system 10. State machine 24 includes a 'Start' state 26, an 'S1' state 28, an 'S2' state 30, an 'S3' state 32, and an 'S4' state 34. In 'S1' state 28, logic system 10 is to perform arbitrary logic functions A, B, and C. In 'S2' state 30, logic system 10 is to perform arbitrary logic functions D and E. In 'S3' state 32, logic system 10 is to perform arbitrary logic functions F and G. In 'S4' state 34, logic system 10 is to perform arbitrary logic functions H and I.

As each state of state machine 24 has only one next state, logic system 10 is preferably implemented using only two CLBs 12: a first CLB and a second CLB. During 'Start' state 26, control unit 16 conveys configuration data to the first CLB which configures the first CLB to realize logic functions A, B, and C required during next state 'S1' (28). When the programming operation performed upon the first CLB is complete, next state 'S1' (28) is entered during the next 'Clock' signal cycle. Control unit 16 asserts the enable signal corresponding to the first CLB. Control unit 16 also issues a control signal to interface unit 20 which causes interface unit 20 to route input signals to, and output signals from, the first CLB. The active first CLB performs logic functions A, B, and C while state machine 24 remains in 'S1' state 28. While state machine 24 is in 'S1' state 28, control unit 16 retrieves the state transition information stored within memory unit 14. Control unit 16 uses the current state information (i.e., 'S1' state 28) and the state transition information (i.e., next state 'S2') to program the inactive second CLB to realize the logic functions D and E required in next state 'S2' (30). State machine 24 remains in state 'S1' (28) until state transition requirements are met.

When the logic circuitry within control unit 16 generates next state 'S2' (30) information from the subset of the input signals and the current state 'S1' (28) information, next state 'S2' (30) is entered during the next 'Clock' signal cycle. Control unit 16 deasserts the enable signal corresponding to the first CLB, and asserts the enable signal corresponding to the second CLB. Control unit 16 also issues a control signal to interface unit 20 which causes interface unit 20 to route input signals to, and output signals from, the second CLB. The active second CLB performs logic functions D and E while state machine 24 remains in 'S2' state 30. While state machine 24 is in 'S2' state 30, control unit 16 uses the current state information and the state transition information (i.e., next state 'S3') to program the inactive first CLB to realize logic functions F and G required in next state 'S3' (32). State machine 24 remains in state 'S2' (30) until state transition requirements are met.

When the logic circuitry within control unit 16 generates next state 'S3' (32) information from the subset of the input signals and the current state 'S2' (30) information, next state 'S3' (32) is entered during the next 'Clock' signal cycle. Control unit 16 deasserts the enable signal corresponding to the second CLB, and asserts the enable signal corresponding to the first CLB. Control unit 16 also issues a control signal to interface unit 20 which causes interface unit 20 to route input signals to, and output signals from, the first CLB. The active first CLB performs logic functions F and G while state machine 24 remains in 'S3' state 32. While state machine 24 is in 'S3' state 32, control unit 16 uses the current state information and the state transition information (i.e., next state 'S4') to program the inactive second CLB to realize logic functions H and I required in next state 'S4' (34). State machine 24 remains in state 'S3' (32) until state transition requirements are met.

When the logic circuitry within control unit 16 generates next state 'S4' (34) information from the subset of the input signals and the current state 'S3' (32) information, next state 'S4' (34) is entered during the next 'Clock' signal cycle. Control unit 16 deasserts the enable signal corresponding to the first CLB, and asserts the enable signal corresponding to the second CLB. Control unit 16 also issues a control signal to interface unit 20 which causes interface unit 20 to route input signals to, and output signals from, the second CLB. The active second CLB performs logic functions H and I while state machine 24 remains in 'S4' state 34. While state machine 24 is in 'S4' state 34, control unit 16 uses the current state information and the state transition information (i.e., next state 'S1') to program the inactive first CLB to realize logic functions A, B, and C required in next state 'S1' (28). State machine 24 remains in state 'S4' (34) until state transition requirements are met.

Figure 3:
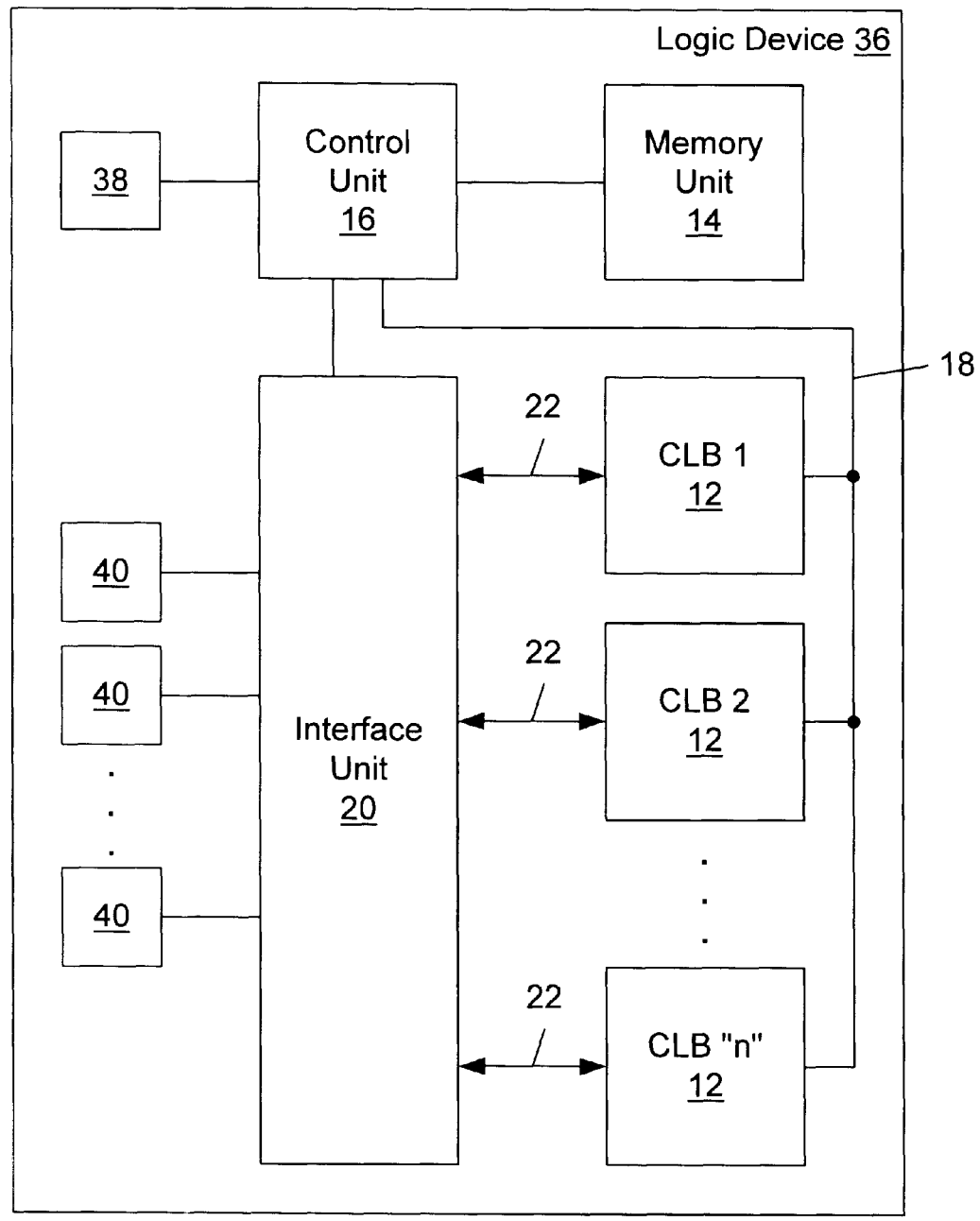
FIG. 3 is a block diagram of a preferred embodiment of the logic system of the present invention: a semiconductor logic device formed upon a single monolithic silicon substrate.

Logic system 10 of FIG. 1 may be implemented by interconnecting several discrete semiconductor logic devices. FIG. 3 is a block diagram of a preferred embodiment of the logic system of the present invention: a single semiconductor logic device 36. Logic device 36 includes multiple CLBs 12, memory unit 14, control unit 16, control bus 18, interface unit 20, multiple interface buses 22, an input/output (I/O) pad 38, and a set of I/O pads 40, all formed upon the same monolithic silicon substrate. Elements described in connection with logic system 10 of FIG. 1 are numbered identically.

The set of I/O pads 40 includes multiple I/O pads. I/O pads are flat metal contact regions located upon an exposed surface of the silicon substrate. Signal lines to be connected to external devices are terminated at I/O pads during manufacture of logic device 36. An I/O pad may be connected to an input signal line, an output signal line, or a combined input/output signal line. Following manufacture, logic device 36 is typically secured within a protective semiconductor device package. Each I/O pad is then connected to a terminal (i.e., pin) of the device package by a signal line (i.e., a wire).

Control unit 16 is coupled to memory unit 14, and is coupled to each CLB 12 via control bus 18. Control unit 16 uses current state information and state transition information from memory unit 14 to program inactive CLBs to realize logic functions required in all possible next states as described above. Control unit 16 programs and enables CLBs 12 via control bus 18. Control unit 16 receives the 'Clock' signal via I/O pad 38.

When memory unit 14 includes read/write storage elements (e.g., EEPROM, NV-RAM, SRAM, or DRAM), logic device 36 includes additional I/O pads coupled to control unit 16. The additional I/O pads are used to transfer (i.e., write) state transition information and configuration data to memory unit 14 during an initialization procedure.

Interface unit 20 is coupled to control unit 16, and is coupled to each CLB 12 by an interface bus 22. Interface unit 20 receives input signals from, and provides output signals to, the set of I/O pads 40. In response to a control signal from control unit 16, interface unit 20 routes input signals to, and output signals from, the active CLB 12 via a corresponding interface bus 22 as described above. Interface unit 20 forwards a subset of the input signals to control unit 16 for the generation of next state information.

As described above, the configuration data is preferably compressed before being stored within memory unit 14 in order to reduce the number of storage locations required to store the configuration data. In this case, control unit 16 retrieves the compressed configuration data from memory unit 14 and decompresses the compressed configuration data before using the configuration data to generate the configuration signals.

Figure 4:
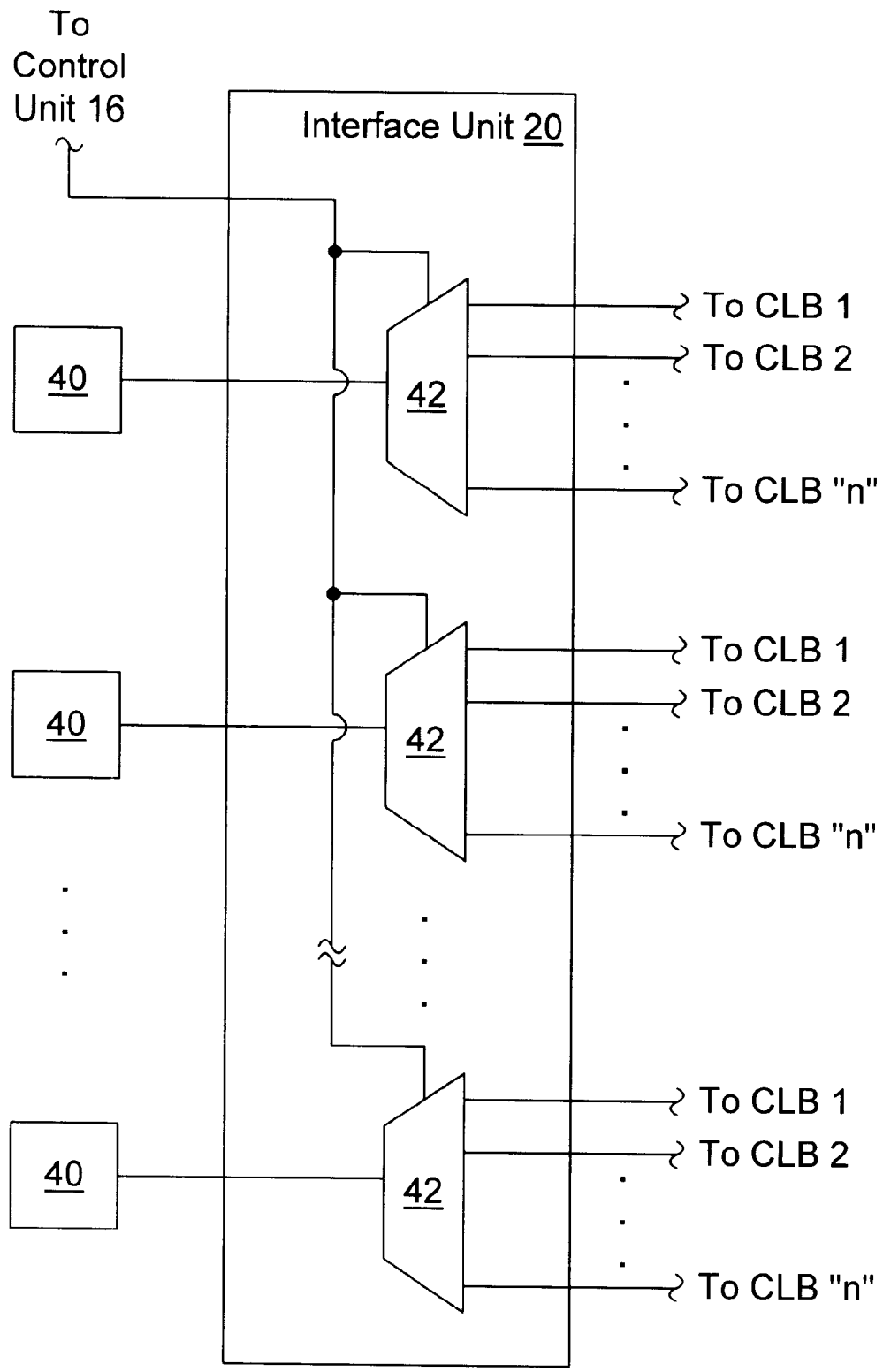
FIG. 4 is a block diagram of a preferred embodiment of an interface unit of the logic device of FIG. 3, wherein the interface unit includes an array of multiplexers.

FIG. 4 is a block diagram of a preferred embodiment of interface unit 20. Interface unit 20 includes an array of 1-to-n multiplexers 42, where n is the number of CLBs 12. In response to a control signal from control unit 16, each 1-to-n multiplexer 42 either: (i) routes an input signal from a given I/O pad of the set of I/O pads 40 to an active CLB 12, or (ii) routes an output signal from the active CLB 12 to the I/O pad, or (iii) forms a signal path between the I/O pad and a combined input/output signal line of the active CLB 12.

Figure 5:
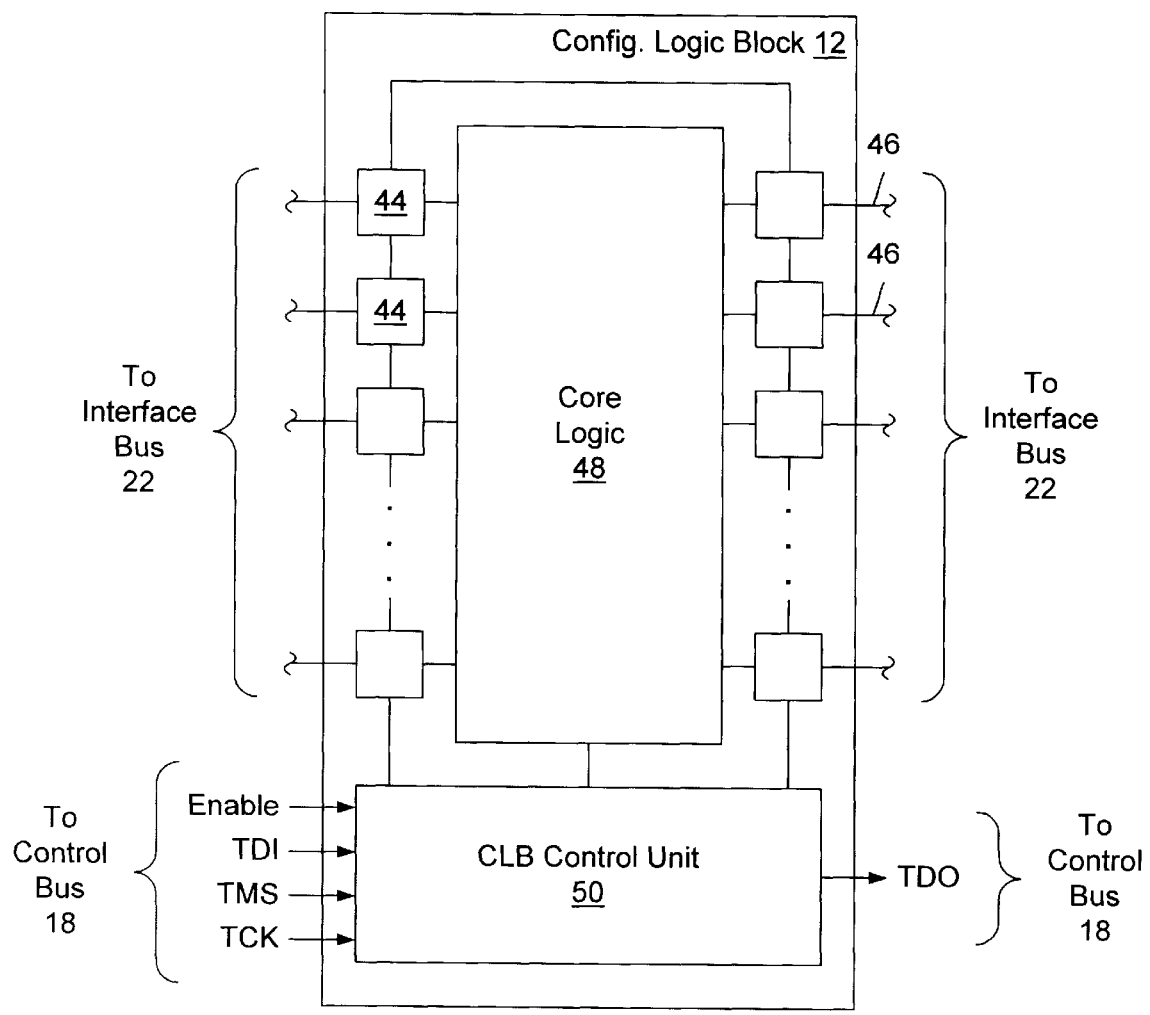
FIG. 5 is a block diagram of a preferred embodiment of each CLB of the logic device of FIG. 3, wherein each CLB includes JTAG boundary-scan testing constructs used to test the CLBs during testing operations, and to configure the CLBs during programming operations.

FIG. 5 is a block diagram of a preferred embodiment of each CLB 12. CLB 12 is configured to facilitate Joint Test Action Group (JTAG) boundary-scan testing of internal circuitry according to IEEE Standard 1149.1-1990. Constructs of the testing architecture are also used to configure the programmable logic within CLB 12 to perform the one or more functions required in any state of the state machine. CLB 12 includes multiple boundary scan cells 44 inserted between corresponding I/O signal lines 46 and a core logic 48. Boundary scan cells 44 are controlled by a CLB control unit 50. When the enable signal from control unit 16 is asserted, signals upon I/O lines 46 flow to and from core logic 48 unimpeded. When the enable signal is deasserted, signals upon I/O lines 46 are disconnected from core logic 48 by placing boundary scan cells 44 in a high impedance state. In a testing mode and a programming mode, CLB control unit 50 configures boundary scan cells 44 to form a serial "scan chain" surrounding core logic 48. Input values, produced by control unit 16, are shifted through the scan chain, then applied to the core logic. In the testing mode, output values produced by core logic 48 are captured by a number of the boundary scan cells 44 and shifted out through the scan chain. Control unit 16 compares the output values to expected values. In the programming mode, the input signals applied to core logic 48 are used to configure programmable switching elements within core logic 48. As a result, core logic 48 is caused to implement the one or more logic functions of a state.

Core logic 48 of CLB 12 preferably includes PAL programmable logic circuitry. Core logic 48 may also include other well known types of programmable logic circuitry such as, for example, EEPROM, FPLA, or FPGA circuitry. The programmable logic within core logic 48 preferably includes storage elements (e.g., flip-flops) needed to implement sequential logic functions.

The multiple CLBs 12 are preferably connected in series to form a serial data scan path for testing and programming. Control bus 18 preferably includes four signal lines: test data input (TDI), test data output (TDO), test mode select (TMS), and test clock (TCK). The TDI signal line carries the input data for testing or programming the multiple CLBs 12. The TDO signal line carries the output data obtained form the core logic 48 of each of the multiple CLBs 12 during testing. The TMS signal line carries the control signal which determines the operating mode of the CLB control units 50. The TCK signal synchronizes the operations of the CLB control units 50. Each CLB control unit 50 has three input signal lines: test data input (TDI), test mode select (TMS), and test clock (TCK). Each CLB control unit 50 also has a single output signal line test data out (TDO). The TMS and TCK signal lines of control bus 18 are connected to the corresponding TMS and TCK inputs of all of the CLB control units 50. The TDI signal line of control bus 18 is connected to the TDI input of a first CLB control unit 50. The TDO output of the first CLB control unit 50 is connected to the TDI input of a second CLB control unit 50. This process is continued until a last CLB control unit 50 is reached. The TDO output of the last CLB control unit 50 is connected to the TDO signal line of control bus 18. A serial data scan path is thus formed through the multiple CLBs 12 for testing and programming. During testing or programming of the multiple CLBs 12, a bypass register within the CLB control unit 50 of the active CLB 12 is enabled, connecting the TDI input signal line to the TDO output signal line. The active CLB 12 is thus effectively bypassed during testing or programming of inactive CLBs 12. Control unit 16 thus configures the programmable switching elements within inactive CLBs 12 via configuration signals conveyed upon the TDI signal line of control bus 18.

It will be appreciated to those skilled in the art having the benefit of this disclosure that this invention is believed to be a logic system and method for implementing a state machine. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A logic system for implementing a state machine, wherein the state machine comprises a plurality of states, and wherein each of the plurality of states has one or more possible next states which may be reached by a single state transition, the logic system comprising:

a control unit configured to produce configuration signals; and a plurality of configurable logic blocks (CLBs) coupled to the control unit, wherein each of the plurality of CLBs is configurable to perform one or more selected logic functions in response to the configuration signals;

wherein when the state machine is in a given state:

one of the plurality of CLBs is "active", wherein the active CLB is coupled to receive a plurality of input signals and performs one or more logic functions associated with the state in order to produce a plurality of output signals; and the control unit provides configuration signals to a number of the remaining CLBs equal to the number of possible next states in order to configure each of the number of the remaining CLBs to perform one or more logic functions associated with one of the one or more possible next states.

2. The logic system as recited in claim 1, wherein each of the plurality of CLBs comprises programmable logic circuitry.

3. The logic system as recited in claim 1, further comprising a memory unit coupled to the control unit and configured to store configuration data used to configure each of the plurality of CLBs.

4. The logic system as recited in claim 1, wherein the control unit is configured to retrieve the configuration data from the memory unit, and wherein the configuration signals produced by the control unit comprise the configuration data.

5. A logic system for implementing a state machine, wherein the state machine comprises a plurality of states, and wherein each of the plurality of states has one or more possible next states which may be reached by a single state transition, the logic system comprising:

a memory unit configured to store configuration data;

a control unit coupled to the memory unit and configured to retrieve the configuration data from the memory unit and to produce configuration signals, wherein the configuration signals comprise the configuration data;

a plurality of configurable logic blocks (CLBs) coupled to the control unit, wherein each of the plurality of CLBs is configurable to perform one or more logic functions in response to the configuration signals; and an interface unit coupled to the control unit and to each of the plurality of CLBs, wherein the interface unit is configured to route a plurality of input signals to, and a plurality of output signals from, one of the plurality of CLBs in response to a control signal from the control unit;

wherein when the state machine is in a given state:

one of the plurality of CLBs is "active", wherein the interface unit routes the plurality of input signals to the active CLB, and wherein the active CLB performs one or more logic functions associated with the state in order to produce the plurality of output signals, and wherein the interface unit routes the plurality of output signals from the active CLB; and the control unit provides configuration signals to a number of the remaining CLBs equal to the number of possible next states in order to configure each of the number of the remaining CLBs to perform one or more logic functions associated with one of the one or more possible next states.

6. The logic system as recited in claim 5, wherein each of the plurality of CLBs comprises programmable logic circuitry.

7. The logic system as recited in claim 6, wherein each of the plurality of CLBs comprises programmable array logic (PAL) circuitry.

8. The logic system as recited in claim 7, wherein the memory unit is further configured to store state transition information.

9. The logic system as recited in claim 8, wherein the control unit is further configured to:

generate and store current state information; and retrieve the state transition information from the memory unit in order to determine the one or more possible next states.

10. The logic system as recited in claim 9, wherein the control unit retrieves configuration data from the memory unit associated with the one or more possible next states, and wherein the configuration signals produced by the control unit comprise the configuration data associated with the one or more possible next states.

11. The logic system as recited in claim 5, wherein the memory unit comprises non-volatile memory elements.

12. The logic system as recited in claim 11, wherein the memory unit comprises mask-programmable ROM circuitry.

13. A logic device formed upon a single monolithic semiconductor substrate for implementing a state machine, wherein the state machine comprises a plurality of states, and wherein each of the plurality of states has one or more possible next states which may be reached by a single state transition, the logic device comprising:

a memory unit configured to store configuration data;

a control unit coupled to the memory unit and configured to retrieve the configuration data from the memory unit and to produce configuration signals, wherein the configuration signals comprise the configuration data; and a plurality of configurable logic blocks (CLBs) coupled to the control unit, wherein each of the plurality of CLBs is configurable to perform one or more logic functions in response to the configuration signals;

a plurality of I/O pads for receiving a plurality of input signals and providing a plurality of output signals; and an interface unit coupled to the control unit, to each of the plurality of I/O pads, and to each of the plurality of CLBs, wherein the interface unit is configured to form a plurality of signals paths between the plurality of I/O pads and one of the plurality of CLBs in response to a control signal from the control unit;

wherein when the state machine is in a given state:

one of the plurality of CLBs is "active", wherein the interface unit routes the plurality of input signals from the plurality of I/O pads to the active CLB, and wherein the active CLB performs one or more logic functions associated with the state in order to produce the plurality of output signals, and wherein the interface unit routes the plurality of output signals from the active CLB to the plurality of I/O pads; and the control unit provides configuration signals to a number of the remaining CLBs equal to the number of possible next states in order to configure each of the number of the remaining CLBs to perform one or more logic functions associated with one of the one or more possible next states.

14. The logic system as recited in claim 13, wherein each of the plurality of CLBs comprises programmable logic circuitry.

15. The logic system as recited in claim 14, wherein each of the plurality of CLBs comprises programmable array logic (PAL) circuitry.

16. The logic system as recited in claim 13, wherein the memory unit is further configured to store state transition information.

17. The logic system as recited in claim 16, wherein the control unit is further configured to:

generate and store current state information; and retrieve the state transition information from the memory unit in order to determine the one or more possible next states.

18. The logic system as recited in claim 17, wherein the control unit retrieves configuration data from the memory unit associated with the one or more possible next states, and wherein the configuration signals produced by the control unit comprise the configuration data associated with the one or more possible next states.

19. The logic system as recited in claim 13, wherein the memory unit comprises non-volatile memory elements.

20. The logic system as recited in claim 19, wherein the memory unit comprises mask-programmable ROM circuitry.

21. A method of implementing a state machine, wherein the state machine comprises a plurality of states, and wherein each of the plurality of states has one or more possible next states which may be reached by a single state transition, the method comprising:

providing a plurality of configurable logic blocks (CLBs), wherein each of the plurality of CLBs is configurable to perform one or more logic functions;

configuring a first CLB to perform one or more logic functions associated with a first state;

entering the first state, and while in the first state, simultaneously:

enabling the first CLB to perform the perform the one or more logic functions associated with the first state; and configuring a number of the remaining CLBs equal to the number of possible next states of the first state in order to configure each of the number of the remaining CLBs to perform one or more logic functions associated with one of the one or more possible next states.

* * * * *